No. 878,929. PATENTED FEB. 11, 1908.
E. BERGIEN.
STOCK WATER TANK.
APPLICATION FILED MAY 23, 1907.

Witnesses:
Fred Palm
George Felter

Inventor:
Edward Bergien
By Oliphant & Young
Attorneys

UNITED STATES PATENT OFFICE.

EDWARD BERGIEN, OF GLENBEULAH, WISCONSIN.

STOCK WATER-TANK.

No. 878,929.　　　Specification of Letters Patent.　　　Patented Feb. 11, 1908.

Application filed May 23, 1907. Serial No. 375,253.

*To all whom it may concern:*

Be it known that I, EDWARD BERGIEN, a citizen of the United States, and resident of Glenbeulah, in the county of Sheboygan and State of Wisconsin, have invented certain new and useful Improvements in Stock Water-Tanks; and I do hereby declare that the following is a full, clear, and exact description thereof.

The object of my invention is to provide a simple, economical and durable cement water-tank for stock, the tank being so constructed as to embody a fire-chamber in its bottom, having a metallic smoke-flue in connection therewith, whereby the tank water may be heated as occasion requires.

The invention therefore consists in certain peculiarities of construction and combination of parts as hereinafter fully set forth with reference to the accompanying drawings and subsequently claimed.

Figure 1:
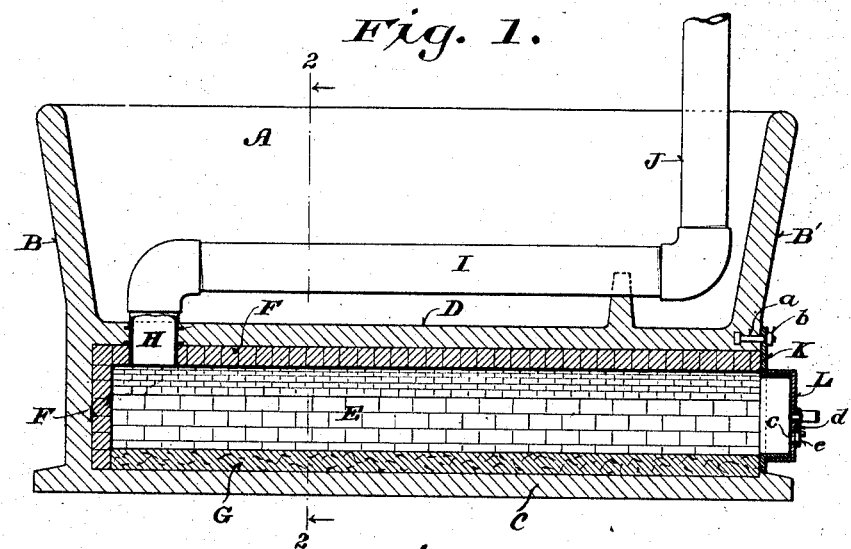
Figure 2:
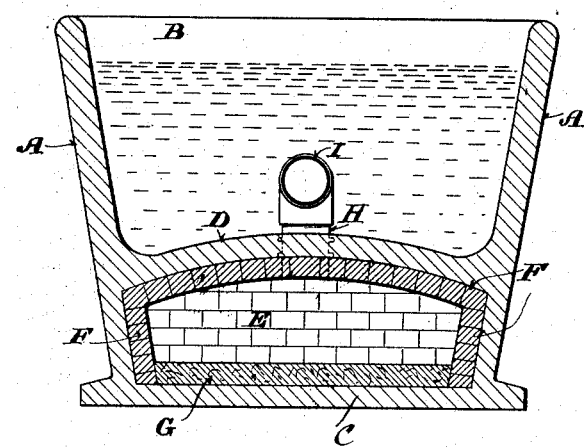
Figure 3:
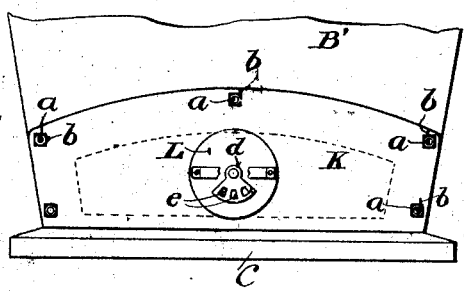

In the drawings: Figure 1 represents a longitudinal central sectional view of a tank made in accordance with my invention; Fig. 2, a cross-section of the same, as indicated by line 2—2 of Fig. 1, and Fig. 3, a fragmentary front elevation of said tank.

Referring by letter to the drawings, A indicates the side-walls, B, B', the end-walls, and D the bottom of a cement-tank, the said bottom and walls forming a base. The side-walls and end-walls B, B' extend downward to form an inclosure constituting a fire-box, said side-walls, closed end B and bottom of the tank, adjacent the fire-box, being lined with suitable fire-brick F. A cement-base connects the side and end-wall extensions of the tank to form a floor C for the fire-box, the floor being coated with suitable fire-clay G to protect the same against heat. The depending portion of the front end-wall B' is open in order that communication may be had to the fire-box for admission of fuel thereto, this opening being provided with a suitable closure as hereinafter described.

A flanged pipe-section H is molded into the bottom D and communicates with the rear end of the fire-box, the pipe being threaded for the reception of an elbow, which in turn receives the threaded end of a pipe I that runs parallel with and longitudinally of the roof. The front end of this pipe is connected to the vertical section of pipe J, by means of another elbow, said pipe extending above the basin at a suitable distance to create draft for the fire-box. The above described pipe-connections in their entirety form a draft-flue, the longitudinal section thereof also assisting in tempering the water, owing to its submerged location therein.

The front of the fire-box portion of the basin is closed by a metallic head-plate K, which plate is secured to the tank by bolts *a* that are embedded into the cement and provided with retaining nuts *b* that serve to hold the head-plate in position. The said head-plate has a circular flanged fuel-opening therein that is closed by a slip-cover L having a series of draft-vents *c*, which vents are controlled by a pivoted sector *d* that is provided with a vent-opening *e*, as shown.

From the foregoing description it will be seen that a cement basin or tank is formed consisting of a one-piece structure having an integral fire-box, the roof of which serves as a bottom for the water-compartment of the tank, through which radiation of heat is distributed to the water. The head-plate and damper arrangement described however may be varied in mechanical detail without departure from my invention.

I claim:

A stock water-tank comprising a cement basin having an apertured bottom, side and end-walls, the side-wall and rear end-wall being extended below the bottom to form a fire-box, a longitudinal metallic pipe-section disposed above the bottom and in watertight connection with the aperture therein adjacent to said rear end-wall, a vertically disposed pipe-section extending from the longitudinal section adjacent to the front end-wall of the basin and terminating above the same, and a vented metallic closure for the front end of the fire-box secured to walls of the basin at the front of same.

In testimony that I claim the foregoing I have hereunto set my hand at Glenbeulah, in the county of Sheboygan and State of Wisconsin, in the presence of two witnesses.

EDWARD BERGIEN.

Witnesses:
M. A. HASLEE,
E. M. THACKRAY.